United States Patent [19]

Tsuchiya

[11] Patent Number: 4,650,296
[45] Date of Patent: Mar. 17, 1987

[54] MAGNIFICATION CHANGING MECHANISM OF A MICROSCOPE

[75] Inventor: Yukikazu Tsuchiya, Kamakura, Japan

[73] Assignee: Nippon Kogaku K.K., Tokyo, Japan

[21] Appl. No.: 794,547

[22] Filed: Nov. 4, 1985

[30] Foreign Application Priority Data

Nov. 12, 1984 [JP] Japan ............................. 59-237993

[51] Int. Cl.$^4$ .................. G02B 7/02; G02B 15/14; G02B 21/00
[52] U.S. Cl. .................................................. 350/519
[58] Field of Search .................... 350/429, 519, 560

[56] References Cited

U.S. PATENT DOCUMENTS 3,060,801 10/1962 Boughton et al. ................ 350/519

Primary Examiner—John K. Corbin
Assistant Examiner—Vincent J. Lemmo
Attorney, Agent, or Firm—Shapiro and Shapiro

[57] ABSTRACT

A magnification changing device in an imaging optical system comprises a magnification changing lens system including first and second lens groups disposed in series on the optic axis of the imaging optical system, a cylindrical cam member rotatable about a rotational axis extending along the optic axis and having first and second cam grooves spirally formed in the circumference thereof, the first cam groove being formed through the peripheral wall of the cylindrical cam member, a cylindrical movable member coupled to the first lens group, the movable member being fitted to the outer periphery of the cylindrical cam member and coupled to the second cam groove to be slid in the direction of the rotational axis while the cylindrical cam member rotates, the peripheral wall of the cylinder of the movable member being partly cut away by a groove extending along the rotational axis from one end opposed to the second lens group, a bar member fitted to the inner periphery of the cylindrical cam member, and a coupling member coupling the second lens group to the bar member through the first cam groove and slidable in the direction of the rotational axis together with the bar member and the first lens group while the cylindrical cam member rotates, the coupling member being provided so as to fit into the groove of the movable member when the first and second lens groups approach each other.

6 Claims, 8 Drawing Figures

MAGNIFICATION CHANGING MECHANISM OF A MICROSCOPE

BACKGROUND OF THE INVENTION

1. Field of the Invention

This invention relates to a magnification changing device in an optical system, and in particular to a mechanism for the magnification changing optical system of a microscope.

2. Description of the Prior Art

In a microscope, there is known a magnification changing optical system disposed between a sample and an eyepiece optical system to enable a zooming operation to be accomplished. As an example, first and second movable lens groups movable in opposite directions along an optic axis are provided between an objective lens group and an imaging lens group fixedly disposed in a direction of the optic axis, whereby a magnification changing optical system can be constituted. Each of the movable lens groups is supported by respective lens cases fitted in the cylindrical housing of the microscope, and each of the lens cases is coupled to a driving mechasnim disposed along the optic axis, In order to maintain an accurate coincidence between an optic axis of each movable lens group and a observation optic axis of the microscope during a movement of the both lens groups, it is preferable that a fitted portion of each lens case in the housing have a sufficient length in a direction of the optic axis.

However, in the case of such a structure, as the magnification change ratio becomes greater and the magnifiation increases, a movement ranges of the first and second lens groups widen and as a result, where a length of the housing is constant, a length over which each lens case is fitted to the housing must unavoidably be shortened and as a result the lens cases become inclined with respect to the optic axis when they move. By the lens cases becoming inclined, a position of the imaging plane is moved. This tendency becomes more remarkable as the magnification increases, and a disorder of a right and a left optic axes occurs in a stereoscopic microscope or the like. Also, this inclination has adversely affected optical aberrations.

SUMMARY OF THE INVENTION

It is an object of the present invention to eliminate these disadvantages and to provide a compact magnification changing device in which the length of fitting can be secured sufficiently long not to adversely affect the optical performances.

According to the present invention, there is provided a magnification changing device in which two cam grooves are formed in a cylindrical cam disposed along the optic axis, a first connecting pin integral with a guide bar fitted to an inner periphery of the cylindrical cam is fitted into one of the cam grooves so as to protrude outwardly therefrom, a second connecting pin integral with a movable member fitted to an outer periphery of the cylindrical cam is fitted into the other cam groove, one of the two magnification changing lens groups is fixed to the first connecting pin, which the other of the two magnification changing lens groups is fixed to the movable member and an escape groove for avoiding the interference between the movable member and the first connecting pin is formed in the movable member.

DESCRIPTION OF THE PREFERRED EMBODIMENTS

Figure 1:
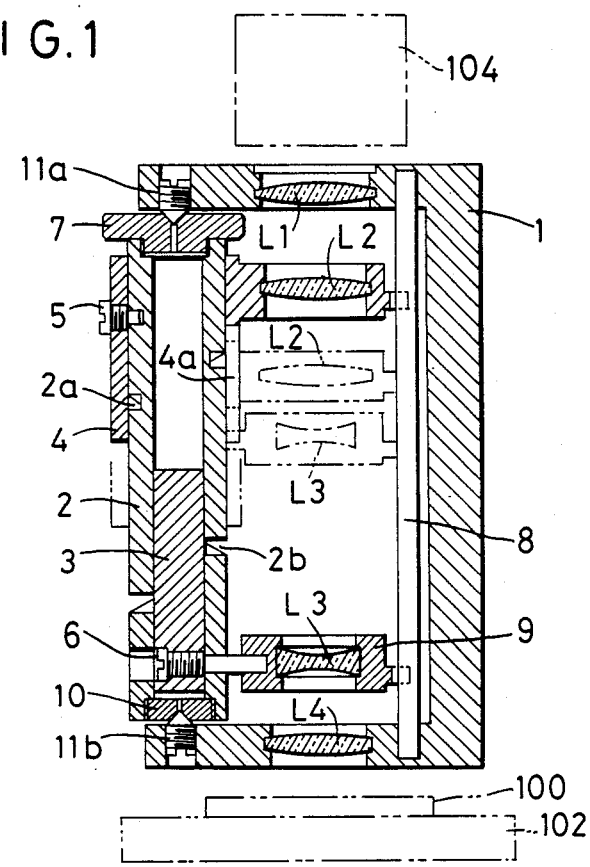
FIG. 1 is a side cross-sectional view of a first embodiment of the magnification changing device according to the present invention.
Figure 2:
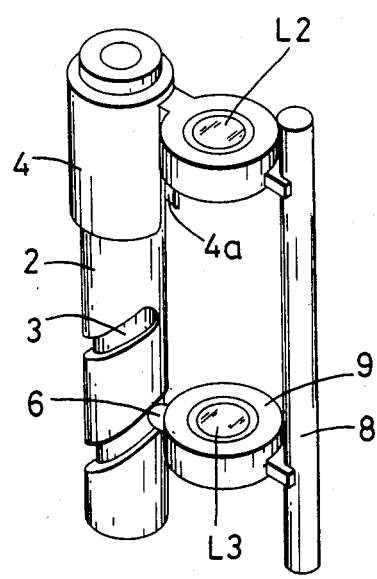
FIG. 2 is a perspective view of the essential portions of FIG. 1.
Figure 3:
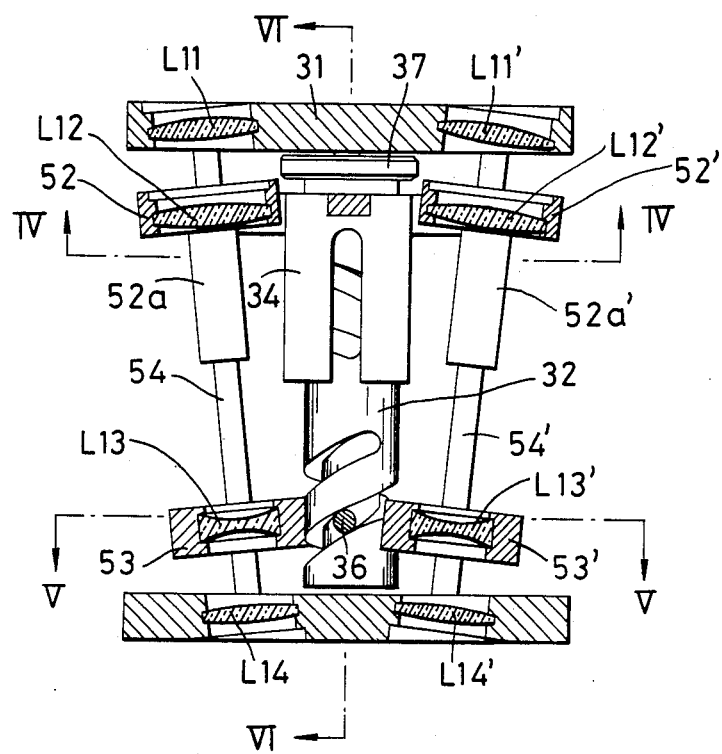
FIG. 3 is a front cross-sectional view of a second embodiment of the present invention.

In FIGS. 1 and 2, there is shown an embodiment in which the magnification changing device of the present invention is applied to a microscope. An optical system including lens groups L1, L2, L3 and L4 is provided in a housing 1 disposed between a workpiece 100 on a sample supporting table 102 and an eyepiece optical system 104. The imaging lens L1 is fixed to an upper end of the housing, and the objective L4 is fixed to a lower end of the housing. The first and second lens groups L2 and L3 for magnification change are held by lens cases 4 and 9, respectively. A cylindrical cam 2 is rotatably mounted on the housing 1 by pivot bearings 11a and 11b through an operating ring 7 and a bearing 10. Two spiral cam grooves 2a and 2b are provided in the cylindrical cam 2 along the outer periphery thereof, the cam groove 2b being formed through the side wall of the cylinder. The lens case 4 is slidably fitted onto an outer periphery of the cylindrical cam 2, and a guide bar 3 is slidably fitted to an inner periphery of the cylindrical cam 2.

A connecting pin 5 is fixed to the lens case 4, and a tip end of the connecting pin 5 is fitted into the cam groove 2a. A connecting pin 6 is fixed to the guide bar 3 and secured to the lens case 9 through the cam groove 2b. The connecting pins 5 and 6 are disposed around a rotational axis of the cylindrical cam 2 so that both axes of the pins 5 and 6 make an angle of about 180° C. The two cam grooves 2a and 2b have pitches in opposite directions, and therefore the lens case 9 moves upwardly in accordance with the cam groove 2b while the lens case 4 is moved downwardly in accordance with the cam groove 2a by rotation of the cylindrical cam 2. A groove 4a extending in the direction of the optic axis is formed in a portion of the lens case 4, and the connecting pin 6 enters into the groove 4a when the second lens group L3 approaches the first lens group L2.

A part of each lens cases 4 and 9 is engaged with a round bar 8 for preventing the rotation which is secured to the housing 1 so that the lens cases 4 and 9 do not rotate when the cylindrical cam 2 is rotated.

When the operating ring 7 is turned, the connecting pins 5 and 6 move along the cam grooves 2a and 2b respectively and whereby the lens case 4 moves downwardly while the lens case 9 moves upwardly as indicated by phantom lines. At this time, the guide bar 3 can enter into the inside of the lens case 4 because of a groove 4a being formed, and correspondingly the guide bar 3 can be formed sufficiently long in the direction of the optic axis. Thereby, a full length of the housing can be made short and also, the first and second lens groups L2 and L3 for magnification change can be made to sufficiently approach each other. Furthermore, because the connecting pins 5 and 6 are disposed oppositely with respect to the rotational axis of the cylindrical cam 2, the cam grooves 2a and 2b can be formed so that a lowest portion of the cam groove 2a is located below a highest portion of the cam groove 2b. Namely, to enable the lens L2 and L3 to approach further, the lowest position of the connecting pin 5 can be selected below the highest position of the connecting pin 6 in a final rotation phase of the cylindrical cam 2.

The connecting pin 6 and the lens case 9 may be made unitary integrally with each other and fixed to the guide bar 3.

In FIGS. 3 to 8, there is shown a second embodiment is which the present invention is applied to an imaging system of a stereoscopic microscope. In the stereoscopic microscope, there is provided a pair of optical systems including a first optical system having lens groups L11, L12, L13, L14 and a second optical system having lens groups L11', L12', L13', L14' both of the optical systems being similar in construction to the above-mentioned first embodiment. A cylindrical cam 32 is rotatably mounted on a housing 31 by pivot bearings 41a and 41b through an operating ring 37 and a bearing 40.

Figure 4:
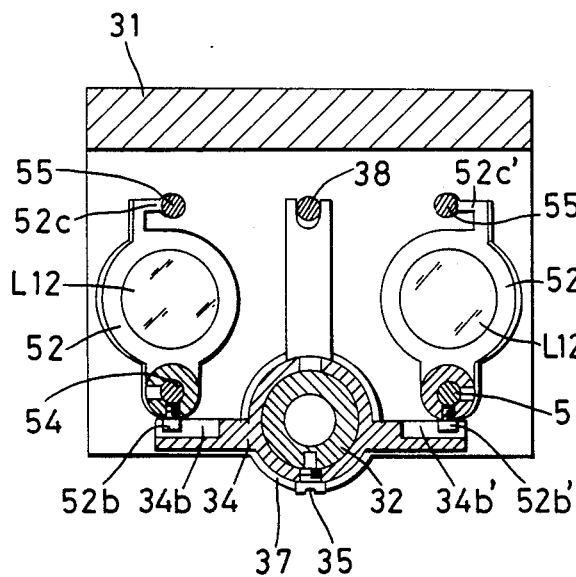
FIG. 4 is a cross-sectional view taken along line IV—IV of FIG. 3.

A cam follower 34 having a pair of arms is slidably fitted to an outer periphery of the cylindrical cam 32 which is similar to that (2) in the first embodiment and, as shown in FIG. 4, pin grooves 34b and 34b' for moving a pair of lens cases 52 and 52' having a pair of first lens groups L12 and L12' in the direction of the optic axis are provided in the two arms of the cam follower 34.

Figure 5:
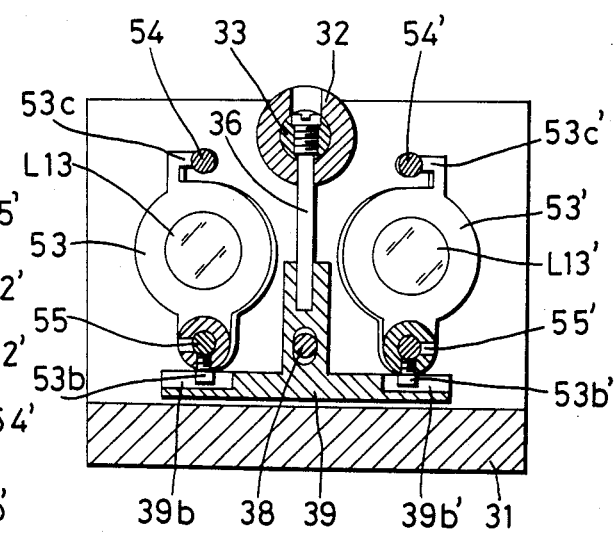
FIG. 5 is a cross-sectional view taken along line V—V of FIG. 3.
Figure 6:
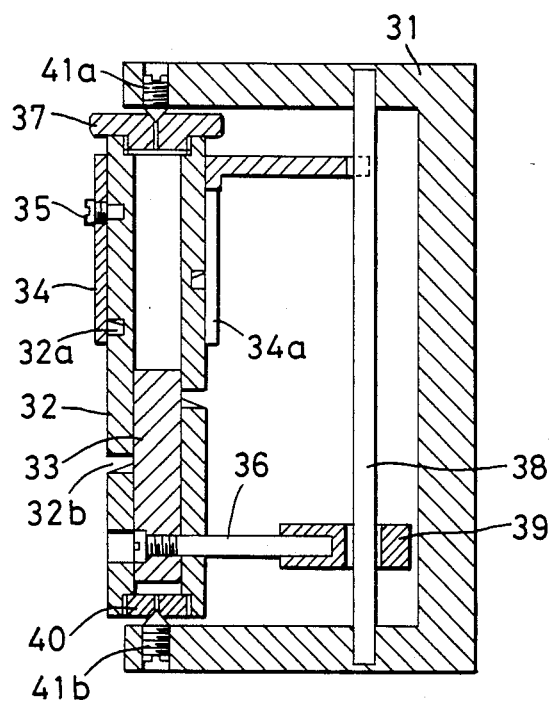
FIG. 6 is a cross-sectional view taken along line VI—VI of FIG. 3.
Figure 7:
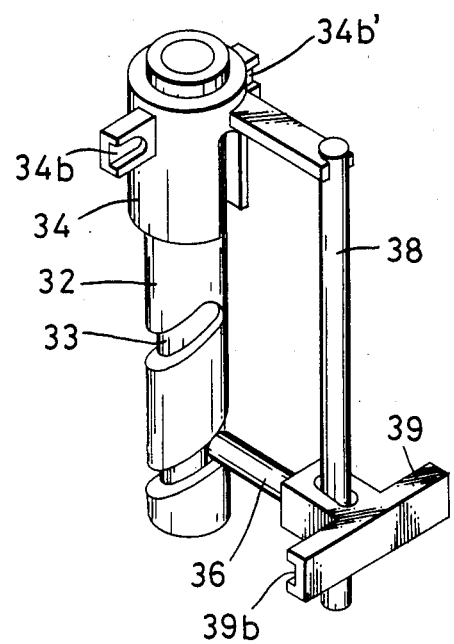
FIG. 7 is a perspective view of the essential portions of FIG. 6.

A guide bar 33 is slidably fitted to an inner periphery of the cylindrical cam 32, and a cam follower 39 having a pair of arms is secured to the guide bar 33 through a connecting pin 36. As shown in FIG. 5, pin grooves 39b and 39b' for moving a pair of lens cases 53 and 53' having a pair of second lens groups L13 and L13' in the direction of the optic axis are provided in an opposite sides of the cam follower 39.

The cam followers 34 and 39 are prevented from rotating by a round bar 38 secured to the housing 31.

On the other hand, the lens cases 52 and 52' have slide cylinders 52a and 52a', respectively, fitted to guide bars 54 and 54' inclined by an inner angle of inclination and secured to the housing 31, and engaging pins 52b and 52b' studded in said slide cylinders are engaged with the pin grooves 34b and 34b' of the cam follower 34 and projections 52c and 52c' are engaged with guide bars 55 and 55' to thereby effect prevention of rotation. Although not shown, the lens cases 52 and 52' are actually pulled on to each other by a spring and accordingly, the projections 52c and 52c' are always in engagement with the guide bars 55 and 55'. When the lens cases 52 and 52' are moved up and down along the guide bars 54 and 54', the lens cases 52 and 52' move laterally in accordance with the inner angle of inclination of the guide bars, and the pin grooves 34b and 34b' of the cam follower 34 permit this lateral movement.

Figure 8:
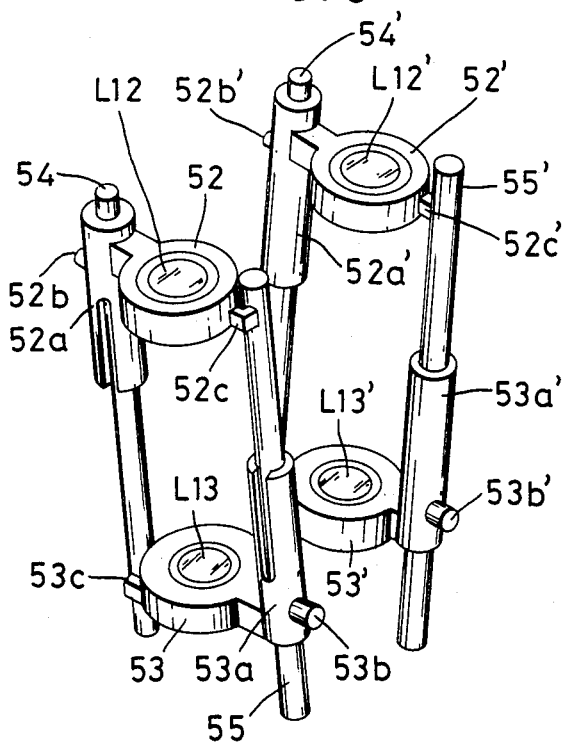
FIG. 8 is a perspective view of the essential portions of FIG. 3.

The lens cases 53 and 53' have slide cylinders 53a and 53a', respectively, fitted to the guide bars 55 and 55' inclined by an inner angle of inclination and secured to the housing 31, and engaging pins 53b and 53b' studded in said slide cylinders are engaged with the pin grooves 39b and 39b' of the cam follower 39 and projections 53c and 53c' are engaged with the guide bars 54 and 54' to thereby effect prevention of rotation. The lens cases 53 and 53' are also pulled on to each other by a spring, not shown, and accordingly, the projections 53c and 53c' are always in engagement with the guide bars 54 and 54'. The pin grooves 39b and 39b' of the cam follower 39 are formed so as to permit the lateral movement accompanying the upward and downward movement of the lens cases 53 and 53' along the guide bars. As shown in FIG. 8, escape grooves along the bars 54 and 54', respectively, for permitting movement of the projections 53c and 53c' are provided in the slide cylinders 52a and 52a', and escape grooves along the bars 55 and 55', respectively, for permitting movement of the projections 52c and 52c' are provided in the slide cylinders 53a and 53a'.

With such a construction, rotation of the operating ring 37 causes rotation of the cylindrical cam 32 and accordingly, the cam followers 34 and 39 move up and down through the cam slots 32a, 32b and the connecting pins 35, 36. The upward and downward movement of the cam followers 34 and 39 are transmitted to the lens cases 52, 52' and 53, 53' through the pin grooves 34b, 34b' and 39, 39b' and the engaging pins 52b, 52b' and 53b, 53b', whereby the lens cases 52, 52' and 53, 53' are moved up and down along the guide bars 54, 54' and 55, 55'. When the lens cases 52 and 53 and the lens cases 52' and 53' approach each other, the guide bar 33 enters into the inside of the cam follower 34 and the connecting pin 36 does not interfere with the cam follower 34 because of the presence of the escape groove 34a of the cam follower 34.

Accordingly, the direction in which the cam follower 34 and the guide bar 33 fit together can be selected to a direction in which they do not interfere with each other and therefore, the full length can be shortened while a sufficient fit length is kept.

The actual observation may be accomplished, for example, through an image rotating prism disposed above the imaging lens groups L11, L11' and an eyepiece.

What I claimed is:

1. A magnification changing device in an imaging optical system, comprising:
   a magnification changing lens system including first and second lens groups disposed in series on an optic axis of said imaging optical system;
   a cylindrical cam member rotatable about a rotational axis extending along said optic axis and having first and second cam grooves spirally formed in a circumference thereof, said first cam groove being formed through a peripheral wall of said cylindrical cam member;
   a cylindrical movable member coupled to said first lens group, said movable member being fitted to an outer periphery of said cylindrical cam member and coupled to said second cam groove to be slid in the direction of said rotational axis while said cylindrical cam member rotates, the peripheral wall of the cylinder of said movable member being partly cut away by a groove extending along said rotational axis from one end opposed to said second lens group;
   a bar member fitted to an inner periphery of said cylindrical cam member; and a coupling member coupling said second lens group to said bar member through said first cam groove and slidable in the direction of said rotational axis together with said bar member and said first lens group while said cylindrical cam member rotates, said coupling member being provided so as to fit into the groove of said movable member when said first and second lens groups approach each other.

2. A magnification changing device according to claim 1, wherein said first and second cam grooves of said cylindrical cam member have pitches in opposite directions.

3. A magnification changing device according to claim 1, further comprising a first holding member holding said first lens group and coupled to said movable member, a second holding member holding said second lens group and coupled to said coupling member, and means for guiding said first and second holding members in the direction of said optic axis.

4. A magnification changing device according to claim 3, wherein said guide means includes a guide member provided in parallelism to said optical axis, and means for sliding said first and second holding members along said guide member.

5. A magnification changing device according to claim 4, further comprising a cylindrical member secured to one of said first and second holding members and fitted on the circumference of said guide member, and an arm member provided on the other of said first and second holding members and in contact with said guide member, the peripheral wall of said cylindrical member being partly cut away by a groove extending along said guide member from one end opposed to said arm member, said arm member being provided so as to fit into the groove of said cylindrical member when said first and second lens groups approach each other.

6. A microscope comprising:
an objective system;
an eyepiece optical system;
a magnification changing lens system including first and second lens groups disposed in series on an optic axis between said objective system and said eyepiece optical system;
a cylindrical cam member rotatable about a rotational axis extending along said optic axis and having first and second cam grooves spirally formed in a circumference thereof, said first cam groove being formed through a peripheral wall of said cylindrical cam member;
a cylindrical movable member coupled to said first lens group, said movable member being fitted to an outer periphery of said cylindrical cam member and coupled to said second cam groove to be slide in the direction of said rotational axis while said cylindrical cam member rotates, the peripheral wall of the cylinder of said movable member being partly cut away by a groove extending along said rotational axis from one end opposed to said second lens group;
a bar member fitted to an inner periphery of said cylindrical cam member; and
a coupling member coupling said second lens group to said bar member through said first cam groove and slidable in the direction of said rotational axis together with said bar member and said first lens group while said cylindrical cam member rotates, said coupling member being provided so as to fit into the groove of said movable member when said first and second lens groups approach each other.

* * * * *